United States Patent [19]

Saiki et al.

[11] Patent Number: 5,135,618
[45] Date of Patent: Aug. 4, 1992

[54] PROCESS FOR MANUFACTURING A SOLID STATE ELECTROLYTIC CAPACITOR

[75] Inventors: Yoshihiko Saiki; Eishun Tsuchida, Tokyo; Kimihisa Yamamoto; Shinji Takeoka, all of Tokyo, Japan

[73] Assignee: NEC Corporation, Japan

[21] Appl. No.: 754,394

[22] Filed: Sep. 3, 1991

[30] Foreign Application Priority Data

Aug. 31, 1990 [JP] Japan .................. 2-232099

[51] Int. Cl.$^5$ ................................. C25D 9/02
[52] U.S. Cl. ........................... 205/171; 205/175; 205/188; 205/200; 205/201
[58] Field of Search ................... 204/14.1, 56.1

[56] References Cited

U.S. PATENT DOCUMENTS 4,929,316  5/1990  Harakawa .................. 204/56.1
5,017,272  5/1991  Kamigawa ................. 204/56.1

Primary Examiner—T. M. Tufariello
Attorney, Agent, or Firm—Leydig, Voit & Mayer

[57] ABSTRACT

A process for manufacturing a solid state electrolytic capacitor having on an anode a dielectric coating layer and a solid state electrolytic layer, comprises the steps of forming a conductive polymer compound layer as the solid state electrolytic layer, and subsequently forming the dielectric coating layer by anodizing.

5 Claims, 2 Drawing Sheets

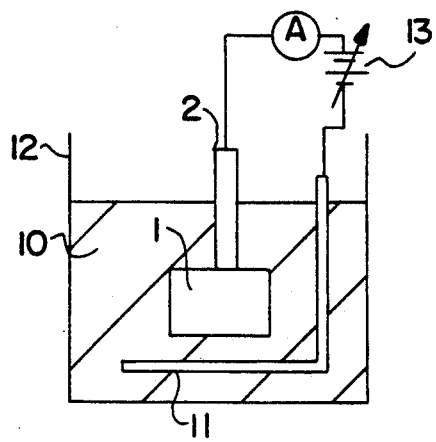
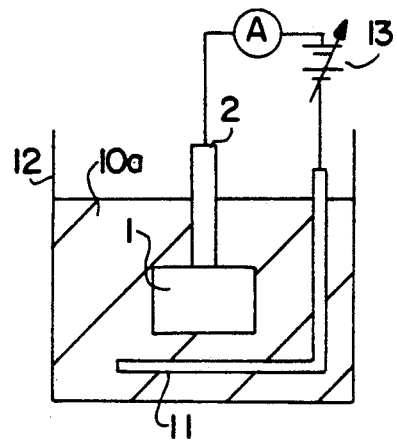
FIG. 1A  FIG. 1B
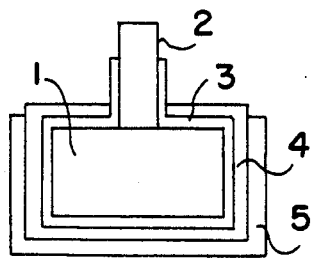
FIG. 2
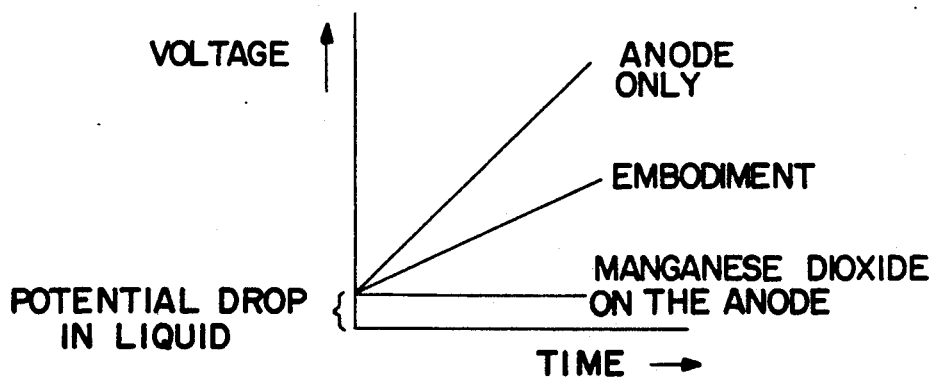
FIG. 4

PROCESS FOR MANUFACTURING A SOLID STATE ELECTROLYTIC CAPACITOR

BACKGROUND OF THE INVENTION

1. Field of the Invention

The present invention relates to a process for manufacturing a solid state electrolytic capacitor having a conductive polymer compound as a solid state electrolyte.

2. Description of the Related Art

According to a conventional method of manufacturing a solid state electrolytic capacitor, a sintered material with an anodized coating or etched foil is soaked in manganese nitrate solution and is then thermally decomposed, providing manganese dioxide as a solid state electrolyte. In this method, however, high heat and nitrogen gas caused in the thermal decomposition process will damage the anodized coating, so that the dielectric strength may drop and the leakage current may increase. Further, since manganese dioxide produced by this method is porous, the capacitor will have insufficient conductivity and a high-frequency characteristic inferior to that of a ceramic capacitor or a film capacitor.

As a solution to those shortcomings, a conductive polymer compound is used as a solid state electrolyte.

There are a chemical oxidative polymerization method and an electrolytic oxidative polymerization method to form a conductive polymer compound on a microporous anode.

A conductive polymer compound acquired by the chemical oxidative polymerization has a shortcoming that it has a lower conductivity and needs more time for its formation than one acquired by the electrolytic oxidative polymerization.

According to the electrolytic oxidative polymerization, however, since an anodized coating is made of an insulating material, it is difficult to be rendered conductive, thus impeding acquisition of a conductive polymer compound with a uniform and sufficient thickness.

To overcome these problems, there has been proposed a method of forming an electrolytically oxidative-polymerized film by forming a thin conductive polymer compound on an anodized coating by chemical oxidative polymerization, and contacting one of the electrodes for electrolytic oxidative polymerization with this polymer compound film.

This method of producing a solid state electrolytic capacitor requires that a needle-like electrode should contact each electrolytic capacitor element. Accordingly, this requires many steps, and may cause the anodized coating to be damaged.

SUMMARY OF THE INVENTION

It is therefore an object of the present invention to provide a process for producing a solid state electrolytic capacitor, which can reduce the number of fabrication steps and can prevent an anodized coating from being damaged.

To achieve this object, according to the present invention, there is provided a process for manufacturing a solid state electrolytic capacitor having on an anode a dielectric coating layer and a solid state electrolytic layer, which comprises the steps of forming a conductive polymer compound layer as the solid state electrolytic layer, and subsequently forming the dielectric coating layer by anodizing.

According to the present invention, the conductive polymer compound layer may be formed by an electrolytic oxidative polymerization method. Also, the conductive polymer compound layer may be formed by a chemical oxidative polymerization method and further formed by the electrolytic oxidative polymerization method. Further, the conductive polymer compound layer may be deposited on an electrolytically oxidative-polymerized layer by chemical oxidative polymerization after anodizing. It is also conceivable that the conductive polymer compound be polypyrrole.

According to the present invention, as a dielectric coating layer is formed after forming a conductive polymer compound, a fine conductive polymer compound with high conductivity can be formed by the electrolytic oxidative polymerization without damaging the dielectric coating layer. This can provide a solid state electrolytic capacitor element having smaller leakage current and lower dielectric loss.

BRIEF DESCRIPTION OF THE DRAWINGS

FIGS. 1A and 1B are exemplary diagrams illustrating stepwise a manufacturing process according to one embodiment of the present invention;

FIG. 2 is a longitudinal cross section of a solid state electrolytic capacitor element acquired by the process according to this embodiment;

FIG. 4 is a characteristic diagram showing a voltage rise during anodizing; and

DETAILED DESCRIPTION OF THE PREFERRED EMBODIMENTS

Figure 3A:
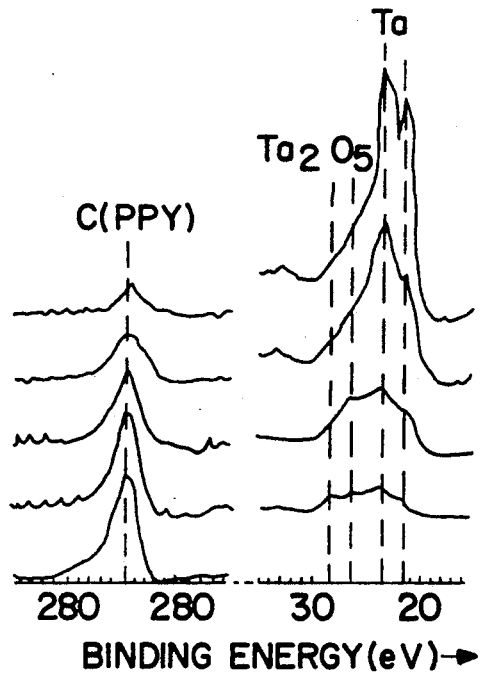
FIGS. 3A and 3B are ESCA spectrum diagrams illustrating the spectrums according to this embodiment and those of a comparative example.

Preferred embodiments of the present invention will now be described referring to the accompanying drawings.

Figs. 1A and 1B are exemplary diagrams illustrating a fabrication process according to one embodiment of the present invention, and FIG. 2 is a longitudinal cross section of a solid state electrolytic capacitor element acquired by the process according to this embodiment.

According to this embodiment, after an anode lead 2 was attached to an anode 1 formed of 100 mg of tantalum metal powder, the anode was soaked in a liquid tank 12 in an electrolyte 10 consisting of 0.1 mol/ of pyrrole, 0.1 mol/ of tetrabutylammonium perchlorate and acetonitrile solvent, and was then connected to a power supply 13, with a platinum electrode as a cathode 11, as shown in Fig. 1A to cause electrolytic oxidative polymerization, forming a conductive polymer compound layer 4 of polypyrrole on the surface of the anode 1. In this case, a current with a density of 25 mA/cm$^2$ was supplied from the power supply 13 for one minute, yielding a black polypyrrole layer about 50 $\mu$m thick.

Then, as shown in Fig. 1B, anodizing was carried out in an electrolyte 10a with a phosphoric acid concentration of 0.5% at a temperature of 50° C., yielding a 0.2—$\mu$m thick, dielectric coating layer 3 of tantalum pentoxide ($Ta_2O_5$).

Figure 3B:
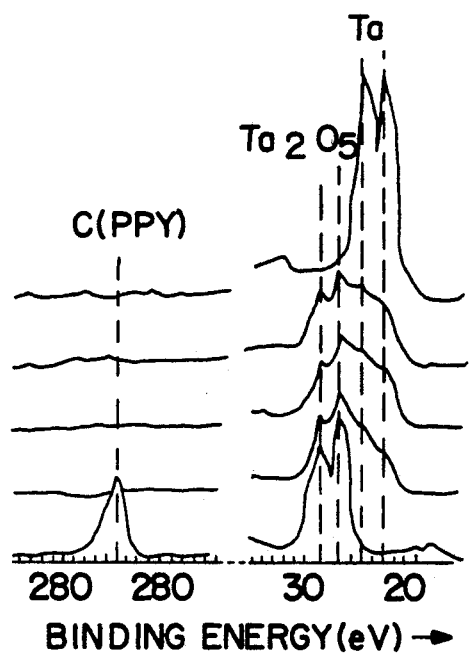

It was confirmed from the ESCA spectrum diagrams shown in FIG. 3 that anodizing after forming a polypyrrole layer surely forms a tantalum pentoxide ($Ta_2O_5$) coating on the surface of the anode 1. FIG. 3A shows the case involving an electrode consisting of polypyrrole (PPY), $Ta_2O_5$ and Ta while FIG. 3B shows the case involving an electrode consisting of $Ta_2O_5$ and Ta, omitting polypyrrole. In these diagrams, the lowest spectrum represents the polypyrrole layer (4) and above this spectrum lie spectrums of individual underlying layers, 30 μm apart from one another.

FIG. 3B shows the spectrums of a $Ta_2O_5$ layer and a Ta layer as compared with this embodiment, and in the embodiment illustrated in FIG. 3B, some of a polypyrrole layer (4), though a slight amount, becomes a Ta layer through a $Ta_2O_5$ layer.

FIG. 4 is a characteristic diagram showing a voltage rise during the anodizing. By way of comparison, FIG. 4 also shows current-voltage characteristics in the cases where the anode 1 without a polypyrrole layer and the anode 1 with a manganese dioxide layer formed thereon are anodized under identical conditions.

It should be apparent from this diagram that the rate of voltage rise for the capacitor element according to this embodiment is lower than the one acquired by an ordinary anodizing method, that is, wherein the anode 1 is directly soaked in an electrolyte. This is because although oxygen ions can move through the polypyrrole layer, their mobility in that layer is smaller than in the electrolyte.

With the manganese dioxide layer formed, there appears only a potential drop in liquid, and no voltage rise thereafter can be shown. This is because the mobility of oxygen ions in the manganese dioxide layer is significantly smaller than the one in a polypyrrole layer.

Then, a cathode conductive layer 5 comprising graphite, silver paste or the like was formed by a well-known method, thus providing a tantalum solid state electrolytic capacitor element with a 10-μF capacitance.

Table 1 given below shows the relationship between the tangent of the dielectric loss (hereinafter referred to as tanδ), leakage current (hereinafter referred to as L·C) and capacitance (hereinafter referred to as C) of the capacitor element according to this embodiment and those of comparative examples. Comparative example 1 provided a capacitor element having a manganese dioxide layer formed after conducting an ordinary anodizing, Comparative example 2 provided a capacitor element having a polypyrrole layer, instead of a manganese dioxide layer, formed by a chemical oxidative polymerization method and Comparative example 3 provided a capacitor element having a polypyrrole layer formed by an electrolytic oxidative polymerization method. The chemical oxidative polymerization was carried out in such a way that the anode 1 after anodizing was impregnated with a solution containing 3% of ferric chloride mixed in an aqueous solution of polyvinyl alcohol, and was then permitted to contact pyrrole vapor, thus forming a polypyrrole layer having almost the same thickness as that of the element acquired by the process according to this embodiment.

TABLE 1

| | (values averaged over n = 20) | | |
|---|---|---|---|
| | tanδ (%) | L.C (μA) | C (μF) |
| First embodiment | 1.6 | 0.01 | 9.6 |

TABLE 1-continued

| | (values averaged over n = 20) | | |
|---|---|---|---|
| | tanδ (%) | L.C (μA) | C (μF) |
| Comparative example 1 | 3.2 | 0.05 | 9.8 |
| Comparative example 2 | 5.8 | 0.01 | 9.8 |
| Comparative example 3 | short | short | short |

It is apparent from Table 1 that the element of this embodiment shows excellent characteristics except for a slightly lower capacitance than Comparative examples 1 and 2. The reason why tanδ of Comparative example 2 is high is that the polypyrrole layer acquired by the chemical oxidative polymerization is porous. With regard to Comparative example 3 obtained through electrolytic oxidative polymerization after forming the dielectric coating layer, since the electrolytic oxidative polymerization is carried out only when the dielectric coating layer is destroyed, the leakage current is significantly increased, causing the shorted state.

Figure 5:
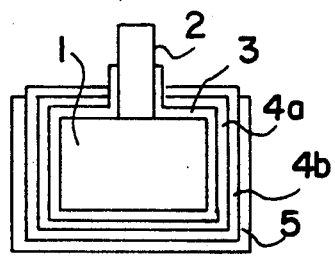
FIGS. 5 and 6 are longitudinal cross sections of solid state electrolytic capacitor elements produced respectively according to second and third embodiments of the present invention.

FIG. 5 is a longitudinal cross section of a solid state electrolytic capacitor element produced according to a second embodiment of the present invention. According to this embodiment, an anode 1 formed of the same material and by the same step as in the first embodiment was impregnated with a solution containing 3% of ferric chloride mixed in an aqueous solution of polyvinyl alcohol, and was exposed to pyrrole vapor for 26 hours, forming a chemically oxidative-polymerized layer 4a of polypyrrole. Then, an electrolytically oxidative-polymerized layer 4b of polypyrrole was formed outside the anode 1 by the same step as done in the first embodiment, and was then subjected to anodizing, thereby forming a dielectric coating layer 3. Then, a cathode conductive layer 5 comprising graphite, silver paste or the like was formed, thus yielding a capacitor element. Table 2 below shows the electric characteristic of this element.

TABLE 2

| | tanδ (%) | L.C (μA) | C (μF) |
|---|---|---|---|
| Second embodiment | 1.9 | 0.01 | 9.8 |

Since a polypyrrole layer is formed on the pore portion of the anode 1 by the chemical oxidative polymerization method in this embodiment, the capacitor element has such an advantage over the capacitor element of the first embodiment that while the value of tanδ is slightly higher, the coating over the pore portion with the polypyrrole is increased, providing a large capacitance.

Figure 6:
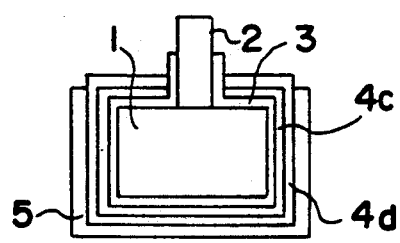

FIG. 6 is a longitudinal cross section of a solid state electrolytic capacitor element produced according to a third embodiment of the present invention. According to this embodiment, after an anode lead 2 was connected to an anode 1 formed of the same material and by the same step as in the first embodiment, the anode was soaked in an electrolyte 10 containing pyrrole (10 mol/), tetrabutylammonium tetrafluoroborate (0.2 mol/) and acetonitrile solvent, to contact electrolytic oxidative polymerization (for one minute with a current density of 10 mA/cm$^2$) with a platinum electrode used as the cathode, as shown in FIG. 1A, thus forming an electrolytically polymerized layer 4c of polypyrrole on the surface of the anode.

Then, the resultant structure was anodized in a phosphoric acid solution (0.5 wt%), forming a 0.2-μm thick dielectric coating layer 3 of tantalum pentoxide. The resultant structure was then impregnated with a solution containing 3% of ferric chloride mixed in an aqueous solution of polyvinyl alcohol. The system was exposed to pyrrole vapor for 20 hours to form a chemically oxidative-polymerized layer 4d of polypyrrole, and was further exposed to iodine vapor for 5 hours to improve the conductivity. Subsequently, a conductive layer 5 comprising graphite or silver paste was formed.

Table 3 below shows the electric characteristic of the capacitor element according to this embodiment.

TABLE 3

| tanδ (%) | L.C (μA) | C (μF) |
|---|---|---|
| 1.9 | 0.01 | 9.9 |

According to this embodiment, as the conductivity and the film-forming property of polypyrrole will be improved, the high-frequency response and the capacitance will be improved and the leakage current will be considerably reduced.

The anode used in this invention is not limited as long as it is made of metal which forms a stable dielectric coating. Preferable metals for the anode include aluminum and niobium, in addition to tantalum.

While polypyrrole is used as a conductive polymer compound in these embodiments, a polymer compound of a heterocyclic 5-membered ring, such as polythiophene and polyfuran, which has a high oxygen mobility, a chained conductive polymer compound, such as polyacetylene, a conductive polymer compound of a condensed ring system, such as polyazulene and polyindole, and a conductive polymer compound, such as polyparaphenylene, polyaniline and polyacene may also be used instead.

What is claimed is:

1. A process for of manufacturing a solid state electrolytic capacitor having on an anode a dielectric coating layer and a solid state electrolytic layer, comprising the steps of:

forming a conductive polymer compound layer as the solid state electrolytic layer; and subsequently forming the dielectric coating layer by anodizing.

2. A process according to claim 1, wherein the conductive polymer compound layer is formed by an electrolytic oxidative polymerization method.

3. A process according to claim 1, wherein the conductive polymer compound layer is formed by a chemical oxidative polymerization method and further formed by an electrolytic oxidative polymerization method.

4. A process according to claim 1, wherein the conductive polymer compound layer is deposited on an electrolytically oxidative-polymerized layer by a chemical oxidative polymerization method after anodizing.

5. A process according to claim 1, wherein the conductive polymer compound is polypyrrole.

* * * * *